United States Patent [19]

Park

[11] Patent Number: 5,550,368
[45] Date of Patent: Aug. 27, 1996

[54] METHOD OF DETECTING FOCUSING ERROR IN AN OPTICAL PICKUP SYSTEM EMPLOYING A REFLECTIVE KNIFE EDGE TO SEPARATE THE OPTICAL SIGNAL FOR COMPARISON

[75] Inventor: Chan-Kyu Park, Seoul, Rep. of Korea

[73] Assignee: Daewoo Electronics Co., Ltd., Seoul, Rep. of Korea

[21] Appl. No.: 340,675

[22] Filed: Nov. 16, 1994

[30] Foreign Application Priority Data

Nov. 16, 1993 [KR] Rep. of Korea ................. 1993-24390

[51] Int. Cl.⁶ .................. G11B 7/00; G01J 1/20
[52] U.S. Cl. ...................... 250/201.5; 369/44.23
[58] Field of Search ............... 250/201.5, 201.2, 250/201.4; 369/44.23, 44.24, 44.14, 116, 117; 356/126, 435

[56] References Cited

U.S. PATENT DOCUMENTS

| | | | |
|---|---|---|---|
| 4,868,377 | 9/1989 | Nishikawa | 250/201.5 |
| 4,888,752 | 12/1989 | Arai | 250/201.5 |
| 5,029,261 | 7/1991 | Koyama et al. | 250/201.5 |
| 5,084,851 | 1/1992 | Noda et al. | 250/201.5 |
| 5,313,441 | 5/1994 | Imai et al. | 369/44.23 |
| 5,374,819 | 12/1994 | Kim et al. | 250/201.5 |
| 5,438,562 | 8/1995 | Kobayashi et al. | 369/44.23 |

*Primary Examiner*—Stephone Allen
*Attorney, Agent, or Firm*—Anderson Kill Olick & Oshinsky, P.C.

[57] ABSTRACT

The optical pick-up system utilizing a knife edge method for a determining focusing error includes a light source, an optical detection unit, a beam splitter, an object lens, a knife edge, a pair of adders and a differential amplifier, wherein the optical detection unit further is provided with a first detector and a second detector, each of the first and the second detectors being equally divided to provide a pair of first and second photoelectric cells. The system is different from an optical pickup system utilizing a conventional knife edge method in that: (1) the detectors are perpendicular to each other; (2) the knife edge reflects a portion of the light beam transmitted by the beam splitter; (3) optical detection unit further includes a first adder and a second adder, each of the adders being used for summing outputs from the first and the second photoelectric cells; and the differential amplifier is used for receiving the outputs of the adders and generating a difference between the outputs from the adders as a focusing error signal.

3 Claims, 4 Drawing Sheets

METHOD OF DETECTING FOCUSING ERROR IN AN OPTICAL PICKUP SYSTEM EMPLOYING A REFLECTIVE KNIFE EDGE TO SEPARATE THE OPTICAL SIGNAL FOR COMPARISON

FIELD OF THE INVENTION

The present invention relates to an optical pickup system; and, more particularly, to an improved knife edge method for use in the system capable of providing an increased optical efficiency.

DESCRIPTION OF THE PRIOR ART

One of the common difficulties in an optical information recording disk, e.g., laser disk, lies in the occurrence of focusing errors. A knife edge method has been introduced to solve the problem.

In FIG. 1, there is illustrated one of the prior art optical pickup system 10 utilizing the knife edge method. The optical pickup system 10 comprises a light source 12, a beam splitter 14, an objective lens 16, an optical information recording disk 19 (hereinafter referred to as an optical disk), a knife edge 20, an optical detector 22, and a differential amplifier 28. In the system, a light beam 13 emitted from the light source 12, e.g., a laser diode, enters the beam splitter 14 and is partially reflected by a reflection surface 15 incorporated therein. The light beam reflected from the reflection surface 15 is radiated through the objective lens 16 onto a recording surface 18 of the optical disk 19 as a focused light beam. The focused light beam reflected from the optical disk 19 is converged by the objective lens 16 and transmitted through the beam splitter 14. The light beam is then made to pass by the knife edge 20, and thereafter, is made to impinge onto the optical detector 22 included therein a reception surface 27 provided with a pair of photoelectric cells. An output in the form of a light beam intensity measurement from each of the photoelectric cells is connected to a first and a second input ports 24, 26 of the differential amplifier 28, respectively, allowing the differential amplifier 28 to detect an associated focusing error by comparing the output from each of the photoelectric cells, the focusing error simply being a difference of the two outputs. The intensity of the light beam impinging on each of the light receiving portions of the reception surface 27 changes based on the positional relationship between the recording surface 18 of the optical disk 19 and a convergence point 17 of the light beam.

When the recording surface 18 of the optical disk and the convergence point 17 coincide, this is known as a "just focused" position, and in such a case the intensity of the light beam impinging on each of the photoelectric cells is the same, and the output from each of the photoelectric cells, and hence, the input to the first and second input ports 24, 26 of the differential amplifier are identical, yielding a zero focusing error. If the recording surface 18 of the optical disk does not coincide with the convergence point 17, the intensity of the light beam impinging on each of the photoelectric cells is different from each other, thereby allowing the system to yield a focusing error signal of a non-zero value with a sign indicating the direction of displacement. This conventional knife edge method, however, requires the knife edge to obstruct a part of the light beam to thereby reduce the optical efficiency of the light beam.

SUMMARY OF THE INVENTION

It is, therefore, a primary object of the present invention to provide an improved knife edge method for use in an optical pickup system capable of increasing the optical efficiency of the light beam.

In accordance with the present invention, there is provided an optical pickup system for determining a focusing error, comprising: a light source for generating a light beam; an optical detection unit having a first detector and a second detector, each of the detectors being capable of generating an output indicative of a light beam intensity measurement, the first and the second detectors being perpendicular to each other, each of the first and second detectors being equally divided to provide a pair of first and second photoelectric cells, wherein the first detector and a convergence point located on an optical disk form an optical axis; a beam splitter provided with a reflection surface for reflecting the light beam from the light source to a recording surface of the optical disk and for transmitting the light beam reflected from the recording surface of the optical disk to the optical detection unit, wherein the reflection surface is positioned in such a way that it is inclined with respect to the optical axis of the light beam reflected from the recording surface; an objective lens, disposed between the beam splitter and the optical disk, for focusing the light beam reflected by the beam splitter on the recording surface and for converging the light beam reflected from the recording surface into the reflection surface of the beam splitter; a knife edge, provided with a back side surface and disposed between the beam splitter and the first detector, for reflecting a portion of the light beam transmitted through the reflection surface of the beam splitter to the second detector using the back side surface of the knife edge, the remaining portion of the light beam transmitted through the beam splitter passing by the knife edge to the first detector, wherein the backside surface of the knife edge is arranged in such a way that it is inclined at a predetermined angle with respect to a first optical axis perpendicular to the second detector; a first adder, the first adder being connected to the first photoelectric cell of the first detector and the first photoelectric cell of the second detector; a second adder, the second adder being connected to the second photoelectric cell of the first detector and the second photoelectric cell of the second detector; and a differential amplifier for generating a focusing error signal by comparing the first and second adder outputs.

BRIEF DESCRIPTION OF THE DRAWINGS

The present invention together with the above and other objects and advantages will become more apparent from the following description of preferred embodiment given in conjunction with the accompanying drawings, wherein.

DETAILED DESCRIPTION OF THE PREFERRED EMBODIMENT

Figure 1:
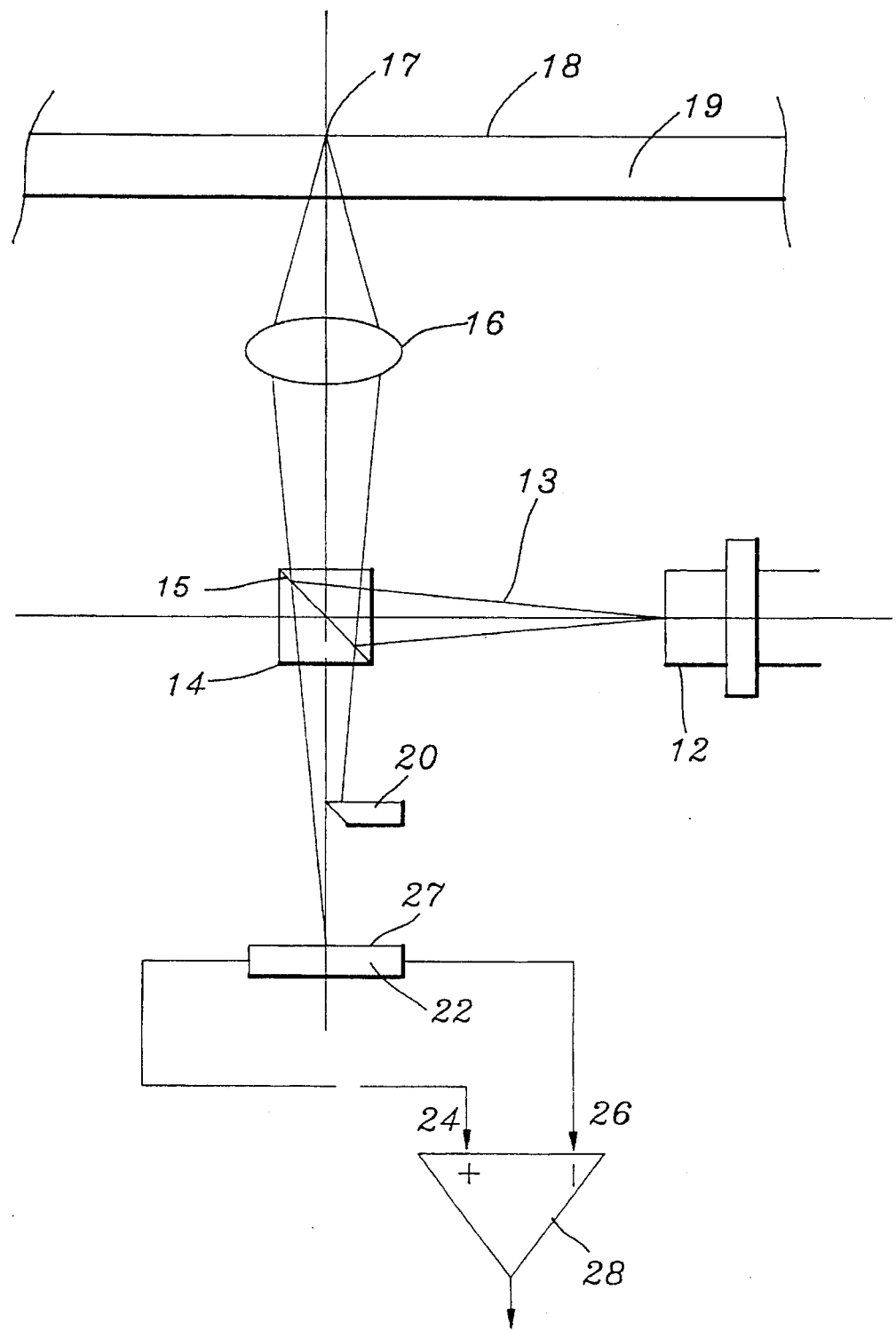
FIG. 1 represents a schematic view of a prior art optical pickup system utilizing a knife edge method.

There are illustrated in FIGS. 2 to 5 various views of the inventive knife edge in accordance with a preferred embodiment of the present invention. It should be noted that like parts appearing therein have like reference numerals.

Figure 2:
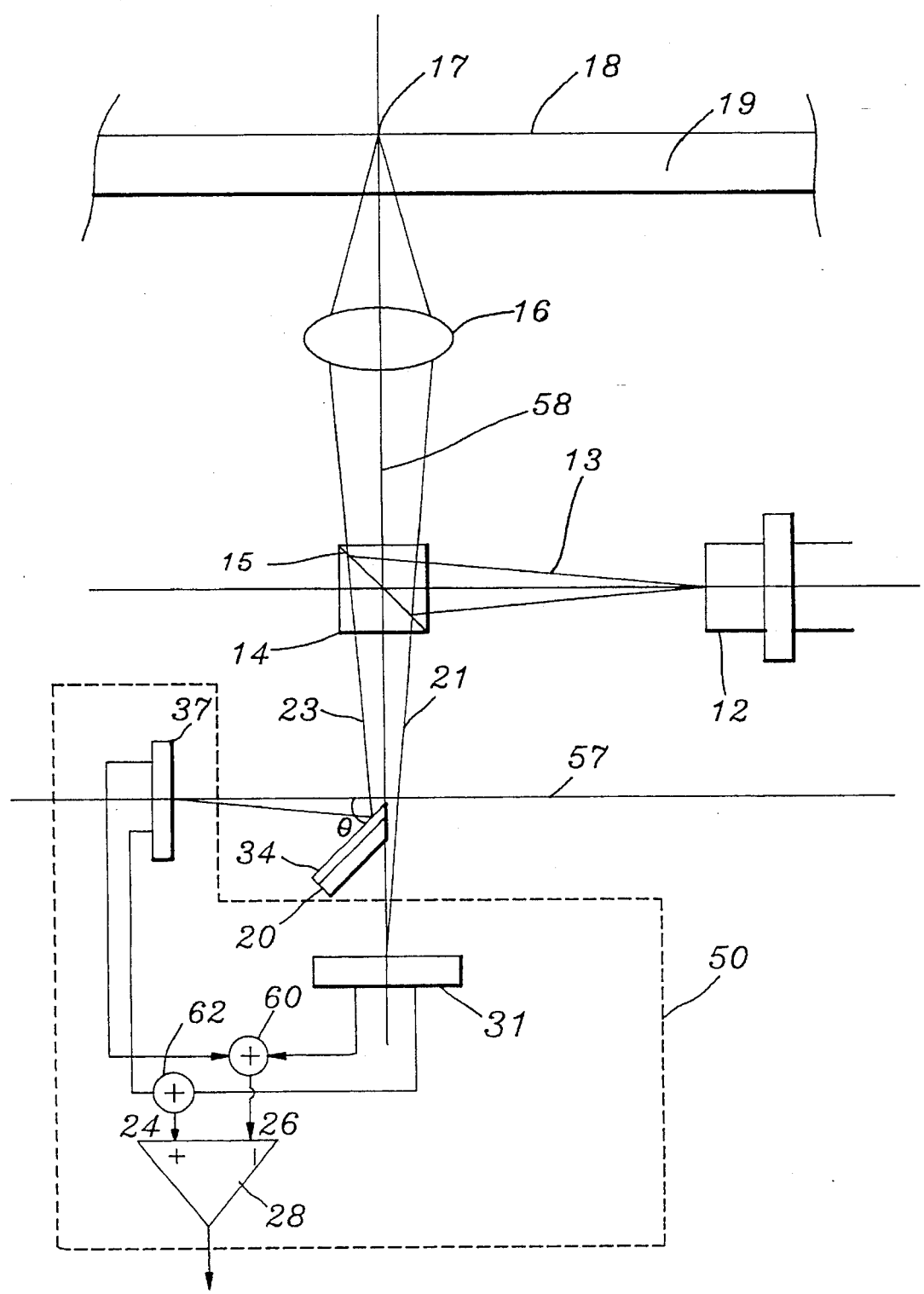
FIG. 2 illustrates a perspective view of the inventive knife edge method in accordance with a preferred embodiment of the present invention.

There is illustrated in FIG. 2 a perspective view of the inventive knife edge 20 for use in an optical pickup system 10, capable of detecting a focusing error, including a light source 12, a beam splitter 14, an objective lens 16, an optical disk 19, a knife edge 20 and an optical detection unit 50 including a first detector and a second detector, 31, 37. In the system 10, the light beam 13 emitted from the light source 12, e.g., a laser diode, enters the beam splitter 14 and is partially reflected by a reflection surface 15 incorporated therein. The light beam reflected from the reflection surface 15 is radiated through the objective lens 16 onto a recording surface 18 of the optical disk 19 as a focused light beam. The focused light beam is reflected from the recording surface 18 and is then transmitted through the beam splitter 14. The focused light beam transmitted through the beam splitter 14 is divided by a knife edge 20 into two portions 21, 23. The knife edge 20 is provided with a back side surface 34 serving as a reflector. The portion 23 of the focused light beam is reflected from the back side surface 34 of the knife edge 20 to a second detector 37 of the optical detection unit 50 and the remaining portion 21 thereof passes by the knife edge 20 to a first detector 31 thereof, wherein the back side surface 34 the knife edge 20 is arranged in such a way that it is inclined at a predetermined angle $\Theta$ with respect a first optical axis 57 perpendicular to the second detector 37. It is preferable that $\Theta$ be 45 degrees.

Figure 3:
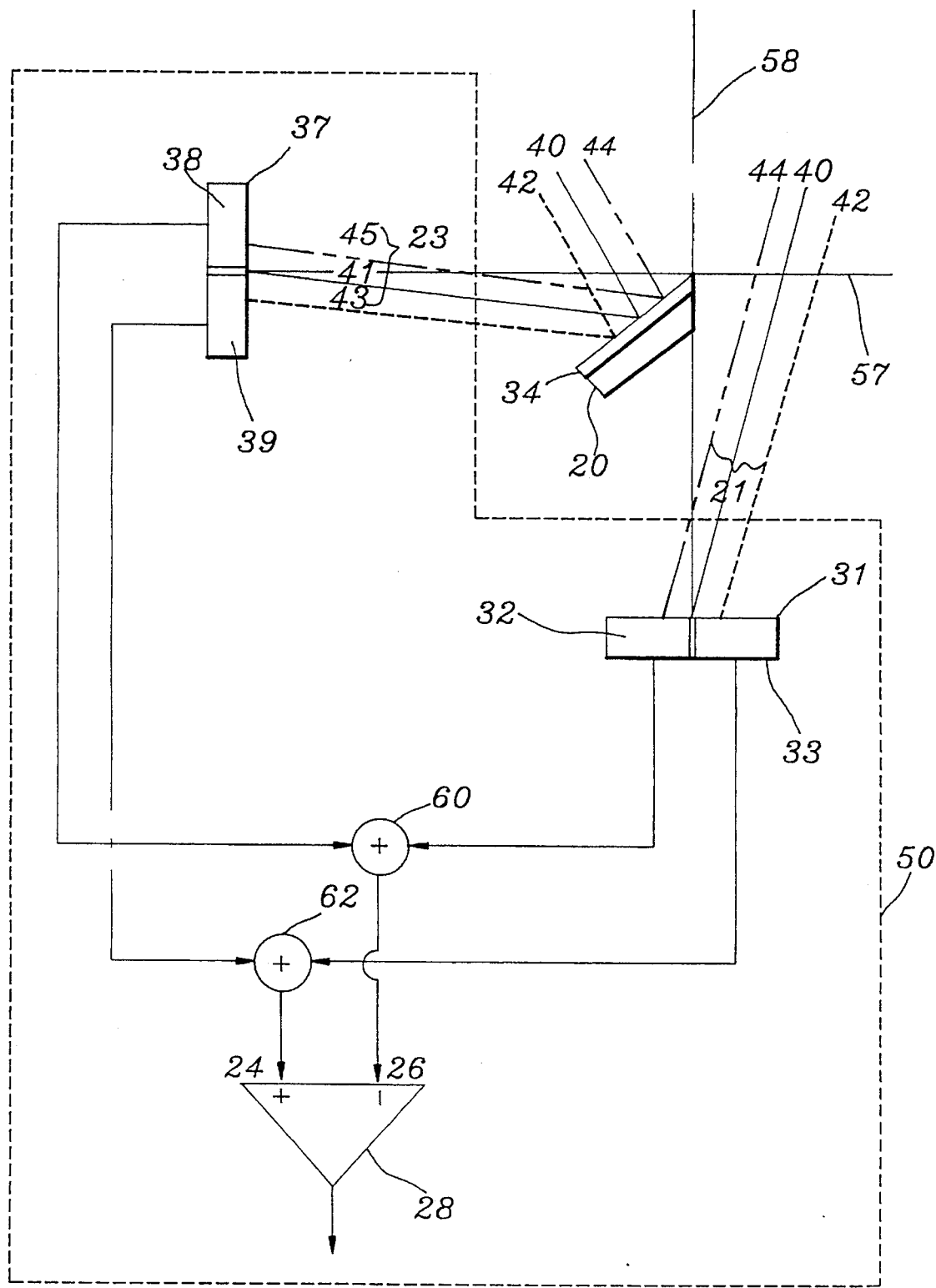
FIG. 3 discloses a detailed diagram illustrating the relationship between the inventive knife edge and the optical detection unit depicted in FIG. 2.

Referring to FIG. 3, the optical detection unit 50 is provided with the first detector 31, the second detector 3, a pair of adders 60, 62 and a differential amplifier 28, wherein the first and the second detectors 31, 37 include a pair of first and second photoelectric cells, e.g., 32, 33, 38, 39, respectively. Each of the photoelectric cells is capable of generating an output indicative of a light beam intensity measurement. The knife edge 20 is inclined at a predetermined angle with respect to the first optical axis 57 perpendicular to the second detector 37 such that the intensity of the part 23 of the focussed light beam reflected by the knife edge 20 impinging on the second detector 37 is identical to that of the remaining part 21 of the focused light beam impinging on the first detector 31. The first and the second optical axes 57, 58 are perpendicular to each other. The output from the first photoelectric cells 32, 38 of the first and the second detectors 31, 37, are inputted to a first adder 60, and those of the second photoelectric cells 33, 39 of the first and the second detectors 31, 37, are sent to a second adder 62, respectively. Outputs from the first and the second adders 60, 62, in turn, are sent to the differential amplifier 28 which produces a difference of the two outputs to thereby provide a focusing error signal.

Figure 4A:
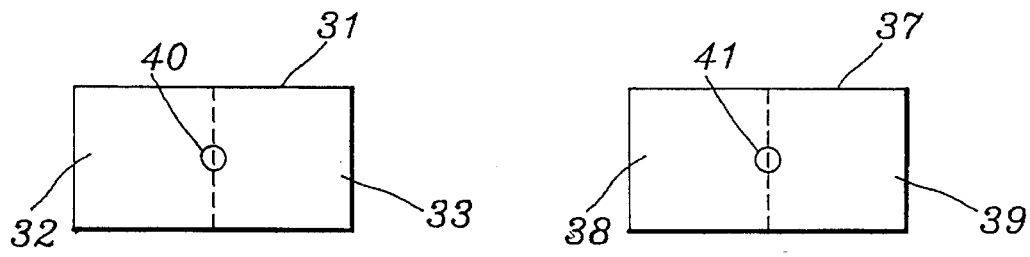
FIGS. 4A–4C exemplify the cross-sectional luminous intensity distribution of the light beam impinging on the reception surface of the detector.
Figure 4B:
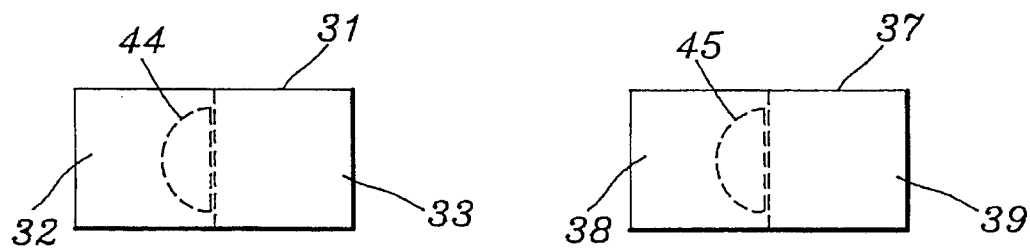
Figure 4C:
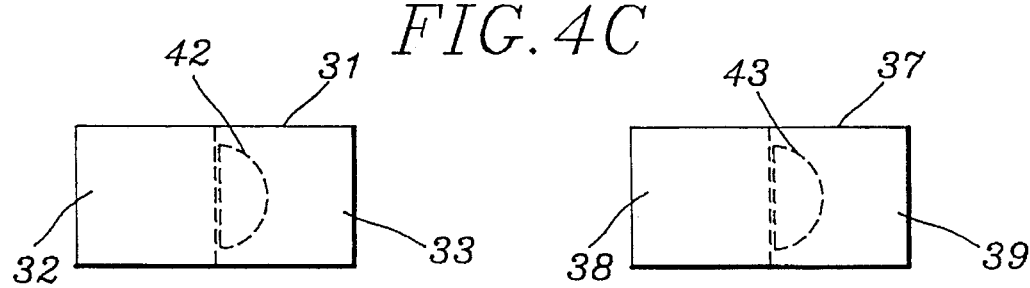

FIG. 4A shows the cross-sectional luminous intensity distribution of the light beams 40, 41 impinging on the center of the reception surface of the first and the second detectors 31, 37 when the optical disk 19 is placed at the just focussed position. If the optical disk 19 moves away from the just focused position, i.e., from the objective lens 16, the cross-sectional luminous intensity distribution of the light beams 44, 45 being imaged on the reception surface of the first and the second detectors 31, 37 is partial toward the first photoelectric cells 32, 38, as shown in FIG. 4B. In the case when the optical disk 19 moves closer to the objective lens 16, the cross-sectional luminous intensity distribution of the light beams 42, 43 being imaged on the reception surface of the detectors 31, 37 is partial toward the second photoelectric cells 33, 39, as illustrated in FIG. 4C.

Figure 5:
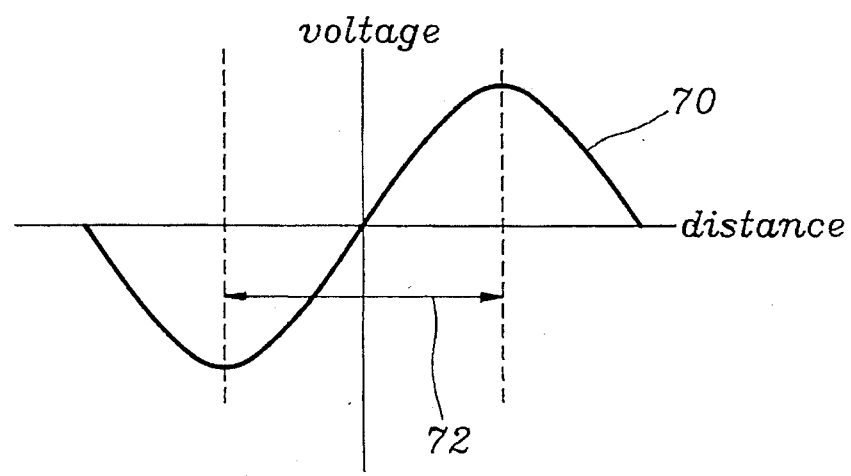
FIG. 5 depicts a the relationship between the displacement of the optical disk and the intensity variation of a focusing error signal.

FIG. 5 illustrates a focusing error detecting signal curve 70 measured as a function of voltage and displacement. The arrow 72 indicates a focus control distance possible. In the system, and the focus control distance ranges are about 15 μm.

As described above, it should be noted that the use of the inventive knife edge method in place of a conventional knife edge method in an optical pickup system increases the optical efficiency of the light beam by utilizing the reflected light beam from the back side surface of the knife edge.

While the present invention has been described with respect to the preferred embodiments, other modifications and variations may be made without departing from the scope of the present invention as set forth in the following claims.

What is claimed is:

1. An optical pickup system for determining a focusing error, comprising:

a light source for generating a light beam;

an optical detection unit having a first detector and a second detector, each of the detectors being capable of generating an output indicative of a light beam intensity measurement, the first and second detectors being perpendicular to each other, each of the first and the second detectors being equally divided to provide a pair of first and second photoelectric cells, wherein the first detector and a convergence point located on an optical disk form an optical axis;

a beam splatter provided with a reflection surface for reflecting the light beam from the light source to a recording surface of the optical disk and for transmitting the light beam reflected from the recording surface of the optical disk to the optical detection unit, wherein the reflection surface is positioned in such a way that it is inclined with respect to the optical axis of the light beam reflected from the recording surface;

an objective lens, disposed between the beam splitter and the optical disk, for focusing the light beam reflected by the beam splitter on the recording surface and for converging the light beam reflected from the recording surface into the reflection surface of the beam splitter;

a knife edge, provided with a back side surface and disposed between the beam splitter and the first detector, for reflecting a portion of the light beam transmitted through the reflection surface of the beam splitter to the second detector using the back side surface of the knife edge, the remaining portion of the light beam transmitted through the beam splitter passing by the knife edge to the first detector, wherein the back side surface of the knife edge is arranged in such a way that it is inclined at a predetermined angle with respect to a first optical axis perpendicular no the second detector;

a first adder, the first adder being connected to the first photoelectric cell of the first detector and the first photoelectric cell of the second detector;

a second adder, the second adder being connected to the second photoelectric cell of the first detector and the second photoelectric cell of the second detector; and a differential amplifier for generating a focusing error signal by comparing the first and second adder outputs.

2. The optical pickup system of claim 1, wherein the back side surface of the knife edge is made of a reflective material.

3. The optical pickup system of claim 1, wherein the predetermined angle is 45 degrees.

* * * * *